March 18, 1924. 1,487,022
P. RABIDEAU
MEANS FOR STARTING AUTOMOBILE ENGINES
Filed Feb. 5, 1923
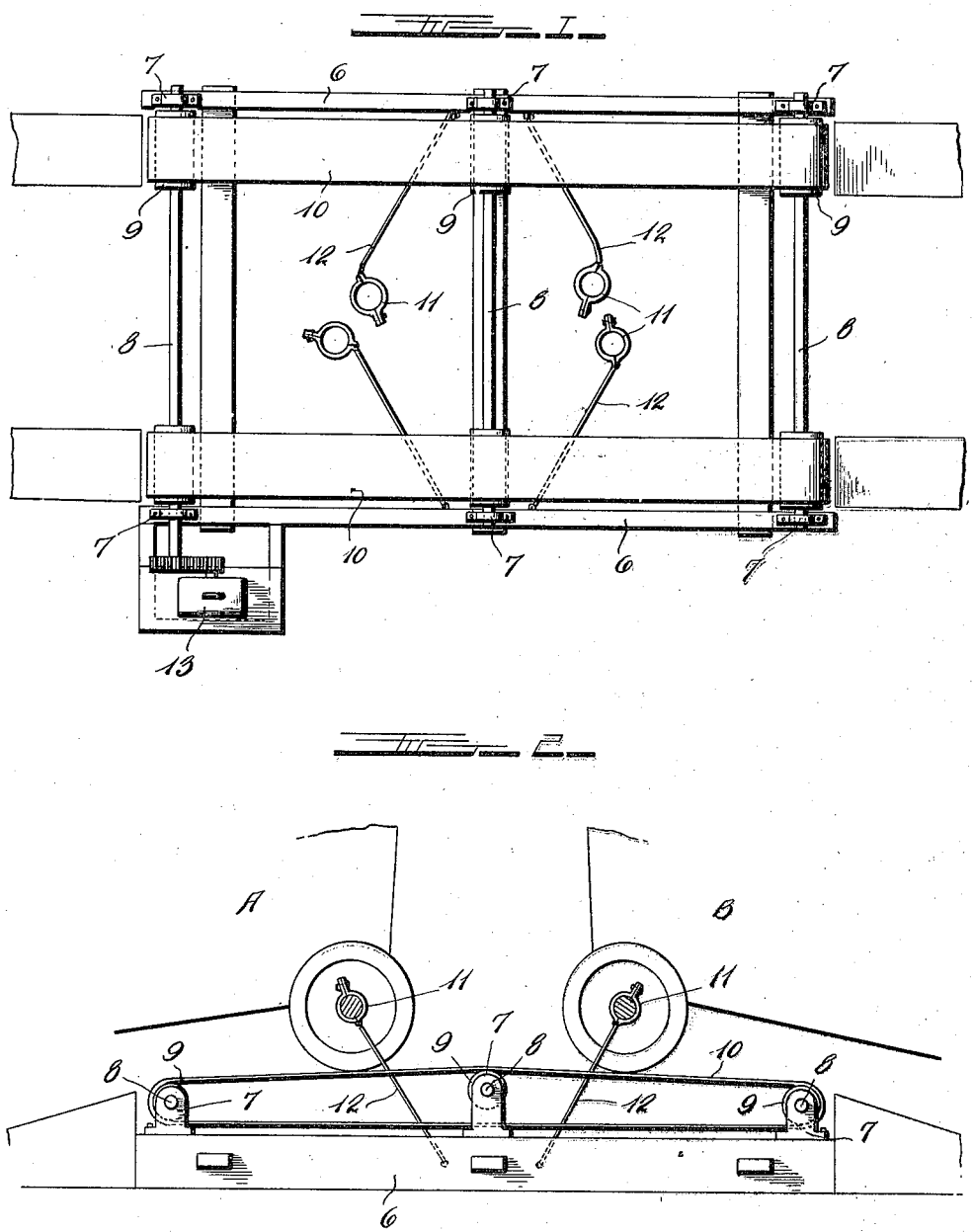

Patented Mar. 18, 1924.

1,487,022

UNITED STATES PATENT OFFICE.

PAUL RABIDEAU, OF CLIFTON, ILLINOIS.

MEANS FOR STARTING AUTOMOBILE ENGINES.

Application filed February 5, 1923. Serial No. 616,982.

*To all whom it may concern:*

Be it known that I, PAUL RABIDEAU, a citizen of the United States, residing at Clifton, in the county of Iroquois and State of Illinois, have invented certain new and useful Improvements in Means for Starting Automobile Engines, of which the following is a specification.

This invention relates to apparatus or mechanism for starting engines of automobiles, and will be found particularly useful in automobile repair shops for starting an automobile after the engine is overhauled. When such jobs are completed, it is often found that the engine is so stiff or the bearings so tight that it cannot be started by the ordinary battery or crank, and so the machine often has to be taken out and towed before it will loosen up sufficiently to permit of ordinary starting.

The device will also be found useful in garages, and elsewhere, for starting cold engines, in which the oil is often so thick that the engine cannot be "turned over" by hand or by the starting battery.

By means of the present apparatus, a tight or cold engine can be started by the use of another car, or by other power if available, for which purpose the apparatus includes a pair of belts on which the rear wheels of the machine to be started may be placed, and the belts are then driven to turn the wheels, and, the machine being thrown in gear, the motion will be transmitted to the engine.

The invention is illustrated in the accompanying drawings in which Fig. 1 is a plan view of the apparatus. Fig. 2 is a side elevation thereof, illustrating the manner of its use.

In the drawings, 6 indicates a base or bottom frame formed of heavy sills and of pieces of proper size and shape to support the parts. And on the sills are bearing blocks 7 on which are journalled the ends of the shafts 8, one at each end and one at the middle, and each shaft has a pair of wide pulleys 9 over which are placed a pair of wide belts 10. Preferably the middle pulleys 8 will be an inch or two higher than the end pulleys, so that the belts incline slightly from the middle toward each end, and will clear the middle pulleys at the under run. The belts are of sufficient size and strength to support the weight of an automobile, and in the use of the device, the automobile to be started, indicated at A, is backed onto one end of the belts and a power automobile, indicated at B, is backed onto the other end. Both automobiles are then fastened in place by clamps 11 connected by cables 12 to the sills, in the space between the belts, the clamps being fastened preferably to the rear axle housings of the automobiles. The engine of the driving machine B is then thrown in gear with the rear wheels, and the rotation thereof drives the belts 10, which thereby also drive the rear wheels of the machine A to be started. Then by throwing in the clutch and gear of machine A, the motion is transmitted to the crank shaft and the engine may be started. After running this way for a short time, the engine will ordinarily be loosened up sufficiently to proceed alone or be started by the usual means.

Instead of using another machine to drive the belts 10, power from other sources may be used as by an electric motor 13 geared to one of the shafts 8, or by other power mechanisms.

I claim:

1. Means for starting an automobile engine comprising a pair of substantially horizontally disposed belts on the opposite ends of which the rear wheels of the automobile whose engine is to be started, and another driving automobile, may be placed, and means to hold the two automobiles on the belts.

2. The means set forth in claim 1, in combination with a middle shaft having pulleys thereon supporting the middle part of the upper run of the belts.

In testimony whereof, I affix my signature in presence of two witnesses.

PAUL RABIDEAU.

Witnesses:
LILY JOHNSON,
HENRY H. MOREL.